United States Patent
Gupta et al.

(10) Patent No.: US 12,349,051 B2
(45) Date of Patent: Jul. 1, 2025

(54) SYSTEM AND METHOD FOR LIMITING A SCOPE OF AUTHORIZATION PROVIDED TO NFC DEVICE

(71) Applicant: Samsung Electronics Co., Ltd., Suwon-si (KR)

(72) Inventors: Varini Gupta, Bangalore (IN); Rohini Rajendran, Bangalore (IN); Rajavelsamy Rajadurai, Bangalore (IN); Ashok Kumar Nayak, Bangalore (IN); Nivedya Parambath Sasi, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 531 days.

(21) Appl. No.: 17/729,537

(22) Filed: Apr. 26, 2022

(65) Prior Publication Data

US 2022/0353802 A1  Nov. 3, 2022

(30) Foreign Application Priority Data

Apr. 28, 2021 (IN) .............................. 202141019531
Mar. 4, 2022 (IN) .............................. 2021 41019531

(51) Int. Cl.
*H04W 48/18* (2009.01)
*H04W 48/16* (2009.01)
*H04W 60/04* (2009.01)

(52) U.S. Cl.
CPC ........... *H04W 48/18* (2013.01); *H04W 48/16* (2013.01); *H04W 60/04* (2013.01)

(58) Field of Classification Search
CPC ..... H04W 48/18; H04W 48/16; H04W 60/04; H04W 12/08; H04W 8/00; H04W 12/084; H04L 41/28
See application file for complete search history.

(56) References Cited

U.S. PATENT DOCUMENTS

| 11,729,587 B1 * | 8/2023 | Engelhart ........... H04W 64/003 455/406 |
| 11,743,699 B2 * | 8/2023 | Bartolomé Rodrigo ..................... H04W 48/16 455/435.1 |

(Continued)

FOREIGN PATENT DOCUMENTS

| WO | 2020/033697 A1 | 2/2020 |
| WO | 2020/254918 A1 | 12/2020 |
| WO | 2021/018460 A1 | 2/2021 |

OTHER PUBLICATIONS

3rd Generation Partnership Project; Technical Specification Group Services and System Aspects; System architecture for the 5G System (5GS); Stage 2 (Release 16), 3GPP TS 23.501 V16.8.0 (Mar. 2021), Mar. 30, 2021, Sophia Antipolis, France.

(Continued)

*Primary Examiner* — Lan-Huong Truong
(74) *Attorney, Agent, or Firm* — Jefferson IP Law, LLP

(57) ABSTRACT

The disclosure relates to a 5G or 6G communication system for supporting a higher data transmission rate. A method for limiting a scope of authorization provided to a network function service consumer (NFC) device in a wireless network by a network repository function (NRF) server is provided. The method includes receiving an NF-registration request message from a network function producer (NFP) device. The NF-registration request message includes at least one of a set of the first information element indicating a single-network slice selection assistance information (S-NSSAI) of the NFC device allowed to access by the NFP device, a corresponding second information element indicating operations allowed on resources of the NFP device belonging to a S-NSSAI of the NFP device, and a third information element indicating a trust-level of the NFC device.

15 Claims, 8 Drawing Sheets

(56) References Cited

U.S. PATENT DOCUMENTS

2020/0336366 A1* 10/2020 Kurian ............... H04L 41/16
2023/0171600 A1* 6/2023 Baskaran ............ H04W 12/086
 455/411
2023/0396602 A1* 12/2023 Wu ................... H04W 12/009
2024/0064139 A1* 2/2024 De Gregorio Rodriguez .............
 H04L 63/083

OTHER PUBLICATIONS

3rd Generation Partnership Project; Technical Specification Group Services and System Aspects; System architecture for the 5G System (5GS); Stage 2 (Release 17), 3GPP TS 23.501 V17.0.0 (Mar. 2021), Mar. 30, 2021, Sophia Antipolis, France.
3rd Generation Partnership Project; Technical Specification Group Services and System Aspects; Procedures for the 5G System (5GS); Stage 2 (Release 15), 3GPP TS 23.502 V15.13.0 (Mar. 2021), Mar. 30, 2021, Sophia Antipolis, France.
3rd Generation Partnership Project; Technical Specification Group Services and System Aspects; Procedures for the 5G System (5GS); Stage 2 (Release 16), 3GPP TS 23.502 V16.8.0 (Mar. 2021), Mar. 30, 2021, Sophia Antipolis, France.
3rd Generation Partnership Project; Technical Specification Group Services and System Aspects; Procedures for the 5G System (5GS); Stage 2 (Release 17), 3GPP TS 23.502 V17.0.0 (Mar. 2021), Mar. 31, 2021, Sophia Antipolis, France.
3rd Generation Partnership Project; Technical Specification Group Core Network and Terminals; 5G System; Technical Realization of Service Based Architecture; Stage 3 (Release 16), 3GPP TS 29.500 V16.7.0 (Mar. 2021), Mar. 30, 2021, Sophia Antipolis, France.
3rd Generation Partnership Project; Technical Specification Group Core Network and Terminals; 5G System; Technical Realization of Service Based Architecture; Stage 3 (Release 17), 3GPP TS 29.500 V17.2.0 (Mar. 2021), Mar. 30, 2021, Sophia Antipolis, France.
3rd Generation Partnership Project; Technical Specification Group Core Network and Terminals; 5G System; Network Function Repository Services; Stage 3 (Release 15), 3GPP TS 29.510 V15.9.0 (Mar. 2021), Mar. 30, 2021, Sophia Antipolis, France.
3rd Generation Partnership Project; Technical Specification Group Core Network and Terminals; 5G System; Network Function Repository Services; Stage 3 (Release 16), 3GPP TS 29.510 V16.7.0 (Mar. 2021), Mar. 30, 2021, Sophia Antipolis, France.
3rd Generation Partnership Project; Technical Specification Group Core Network and Terminals; 5G System; Network Function Repository Services; Stage 3 (Release 17), 3GPP TS 29.510 V17.1.0 (Mar. 2021), Mar. 30, 2021, Sophia Antipolis, France.
3rd Generation Partnership Project; Technical Specification Group Services and System Aspects; Security architecture and procedures for 5G system (Release 15), 3GPP TS 33.501 V15.12.0 (Mar. 2021), Apr. 6, 2021, Sophia Antipolis, France.
3rd Generation Partnership Project; Technical Specification Group Services and System Aspects; Security architecture and procedures for 5G system (Release 16), 3GPP TS 33.501 V16.6.0 (Mar. 2021), Apr. 6, 2021, Sophia Antipolis, France.
3rd Generation Partnership Project; Technical Specification Group Services and System Aspects; Security architecture and procedures for 5G system (Release 17), 3GPP TS 33.501 V17.1.0 (Mar. 2021), Apr. 6, 2021, Sophia Antipolis, France.
Indian Office Action dated Dec. 1, 2022, issued in Indian Application No. 202141019531.
Extended European Search Report dated Jul. 24, 2024, issued in European Application No. 22796146.3-1215.
Ericsson; NF Profile for NF as Service Consumer, 3GPP TSG-CT WG4 Meeting #101e, C4-205362; Oct. 26, 2020.
Ericsson, Nokia, Nokia Shanghai Bell, Huawei; Resource-Level Authorization; 3GPP TSG-CT WG4 Meeting #98e; C4-203318; May 22, 2020.
Samsung; Evaluation and Conclusion for Key Issue #9; 3GPP TSG-SA3 Meeting #106-e; S3-220287, Feb. 7, 2022.
3rd Generation Partnership Project; Technical Specification Group Services and System Aspects; Security architecture and procedures for 5G system (Release 17), 3GPP TS 33.501 V17.1.0, Apr. 4, 2021, Valbonne, France.
International Search Report dated Aug. 4, 2022, issued in International Application No. PCT/KR2022/006043.
Korean Office Action dated Jan. 2, 2025, issued in Korean Application No. 10-2023-7034624.

* cited by examiner

SYSTEM AND METHOD FOR LIMITING A SCOPE OF AUTHORIZATION PROVIDED TO NFC DEVICE

CROSS-REFERENCE TO RELATED APPLICATION(S)

This application is based on and claims priority under 35 U.S.C. § 119(a) of an Indian Provisional patent application number 202141019531, filed on Apr. 28, 2021, in the Indian Intellectual Property Office, and of an Indian Complete patent application number 202141019531, filed on Mar. 4, 2022, in the Indian Intellectual Property Office, the disclosure of each of which is incorporated by reference herein in its entirety.

BACKGROUND

1. Field

The disclosure relates to a field of wireless networks. More particularly, the disclosure relates to a system and a method of limiting the scope of authorization provided to a service consumer, for accessing the services provided by a service producer, in a $5^{th}$ generation (5G) core network based on service based architecture.

2. Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

In general, a $3^{rd}$ generation partnership project (3GPP) Release 15 introduced service based architecture for a 5G-core that involves a set of inter-connected network functions (NFs), each with authorization to access each other's services. The authorization framework uses the OAuth 2.0 framework as specified in request for comments (RFC) 6749, whereby authorization tokens (also called access tokens) are granted to NF Service Consumers, defining the "scope" of access in the NF Service Producer.

As specified in 3GPP TS 33.501, the basic scope provided by the authorization token is at a service level. Depending on the NF Service Producer configuration, higher level of granularity for the authorization token can be defined by adding "additional scope" information within the token e.g., to authorize specific service operations and/or resources/data sets within service operations per the NF Service Consumer type.

The network repository function (NRF) plays the role of OAuth 2.0 authorization server. It exposes nnrf_accesstoken service which allows the NF service consumers (OAuth 2.0 Clients) to request an OAuth2 access token from the NRF device, to access services offered by the NF service producers (OAuth 2.0 resource server).

The NRF server also exposes the Nnrf_NFManagement service, which allows the NF Service Producers to register their profile in the NRF device. The profile includes the services offered by the NF Service Producers, and their authorization policy, e.g., which NFs are allowed to access them, what are they allowed to access, or the like. The NRF server allows the NF service consumers to discover other NF Instances with the potential services they offer, by querying the NRF server using the Nnrf_NFDiscovery service.

When the NF Service Producer creates or updates its nf-profile in NRF using Nnrf_NFManagement service, the profile contains parameters as listed below:
  allowedPlmns: PLMNs allowed to access the nf/nf-service instance,
  allowedSnpns: SNPNs allowed to access the nf/nf-service instance,
  allowedNfTypes: Type of the NFs allowed to access the nf/nf-service instance,
  allowedNfDomains: NF domain names allowed to access the nf/nf-service instance,
  allowedNssais: S-NSSAI of the allowed slices to access the nf/nf-service instance,
  allowedOperationsPerNfType: allowed operations on resources for each type of NF, and
  allowedOperationsPerNfInstance: allowed operations on resources for a given NF Instance.

The access-token granted by the NRF server contains following information:
  NF Instance Id of NRF (issuer),
  NF Instance Id of the NF Service Consumer (subject),
  NF type of the NF Service Producer (audience),
  scope (Service names, allowed resources and allowed operations),
  expiration time, and
  Optionally the claims may include a list of NSSAIs or NSI IDs for the expected NF Service Producer instances.

From the above information, one can see that when the NF service consumer wishes to utilize the services offered by the NF service producer, and request for access-token from the NRF server, the NRF server uses above parameters to validate if the NF service consumer is allowed to access the requested service in the NF service producer, before granting an access-token. The NRF server can validate, based on the NF Type or NF-Instance ID of the NF service consumer, what operations NF service consumer is allowed to perform in the target NF service producer. These policies however do not allow the NRF to restrict the information a NF service consumer is allowed to access in the NF service producer, especially belonging to other slices or if the NF service producer is a shared NF in more than one slice(s).

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a system and a method of limiting the scope of authorization provided to network function (NF) service consumer.

Another aspect of the disclosure is to avoid any malicious network function belonging to other slice(s), access the services from a shared network function (producer) when it is not authorized to.

Another aspect of the disclosure is to provide verification at a network function service producer to allow or not the network function service consumer to access the service based on S-NSSAI granularity.

Another aspect of the disclosure is to provide ability for NF service producer to register its Inter-Slice access policies in the NRF server.

Another aspect of the disclosure is to provide ability for NF service producer to verify the Inter-Slice access request from an NF-consumer based on its S-NSSAI.

Another aspect of the disclosure is to prevent a malicious NF from accessing resources the NRF server, so as to enable a more secure network, especially in view of integration of many verticals with 5G core (5GC), and the deployment of mobile virtual network operator (MVNO).

Additional aspects will be set forth in part in the description which follows and, in part, will be apparent from the description, or may be learned by practice of the presented embodiments.

In accordance with an aspect of the disclosure, a method for limiting a scope of authorization provided to a network function (NF)-service consumer (NFC) device in a wireless network is provided. The method includes receiving, by a network repository function (NRF) server, an NF-registration request message from a NF-service producer (NFP) device. The NF-registration request message includes at least one of a set of the first information element indicating a single-network slice selection assistance information (S-NSSAI) of the NFC device allowed to access by the NFP device, a corresponding second information element indicating operations allowed on resources of the NFP device belonging to at least one S-NSSAI of the NFP device, and a third information element indicating a trust-level of the NFC device. Further, the method includes registering, by the NRF server, a profile of the NFP device based on at least one of the first information element, the second information element, or the third information element.

In an embodiment of the disclosure, further, the method includes receiving, by the NRF server, a NF discovery request from the NFC device to detect the NFP device. Further, the method includes sending, by the NRF server, the profile of the NFP device to the NFC device. The profile of the NFP device comprises at-least one of the S-NSSAIs of the NFC device that are supported by the NFP, and other profile information filtered according to the trust-level of the NFC device.

In an embodiment of the disclosure, further, the method includes receiving, by the NRF server, an access token request from the NFC device to access the resources of the NFP device. Further, the method includes determining, by the NRF server, at least one of the scope of authorization indicating the operations the NFC device is allowed to perform on the resources in NFP, and a trust-level of the NFC device based on at least one of the first information element, the second element, or the third information element. Further, the method includes sending, by the NRF server, an access token response including at least one of the scope of authorization, the S-NSSAIs of the NFC device, or the trust-level to the NFC device.

In an embodiment of the disclosure, the trust-level indicates a partial access to the resources of the NFP device by the NFC device or a full access to the resources of the NFP device by the NFC device.

In accordance with another aspect of the disclosure, a method for limiting a scope of authorization provided to a network function (NF) service consumer (NFC) device in a wireless network is provided. The method includes receiving, by the NFP device, a service request message from the NFC device, wherein the service request message comprises an access token issued by the NRF server to allow the NFC device to access the resources of the NFP device. Further, the method includes allowing, by the NFP device, to access the resources of the NFP device based on the S-NSSAI of the NFP device and the access token issued by the NRF server to allow the NFC device to access the resources of the NFP device.

In an embodiment of the disclosure, the access token comprises at least one of scope of authorization, the S-NSSAIs of the NFC device and the trust-level of the NFC device.

In an embodiment of the disclosure, the NFP device filters the information it provides to the NFC device according to the trust-level received in the access-token.

In accordance with another aspect of the disclosure, a method for limiting a scope of authorization provided to an NF-service consumer (NFC) device in a wireless network is provided. The method includes sending, by the NFC device, a NF discovery request to a NRF server to detect the NFP device. Further, the method includes receiving, by the NFC device, a profile of the NFP device from the NRF server, wherein the profile of the NFP device comprises the S-NSSAIs of the NFC device supported by the NFP device. Further, the method includes sending, by the NFC device, an access token request to the NRF server to access the resources of the NFP device. Further, the method includes receiving, by the NFC device, an access token response including at least one of scope of authorization, the S-NSSAIs of the NFC device, and a trust-level of the NFC device, to access the resources of the NFP device, from the NRF server.

In an embodiment of the disclosure, the method includes sending, by the NFC device, a service request message to the NFP device, wherein the service request message comprises an access token containing at least one of scope of authorization, the S-NSSAIs of the NFC device, and the trust-level of the NFC device, issued by the NRF server, to allow the NFC device to access the operations of the NFP device. Further, the method includes receiving, by the NFC device, a service response message to allow access to the operations of the NFP device based on the access token issued by the NRF server.

In an embodiment of the disclosure, the trust-level for the NFC device is determined by a NRF server based on local configuration.

In an embodiment of the disclosure, the trust-level for the NFC device is registered in a NRF server by the NFP as part of NF-registration based on a plurality of parameters associated with the NFC.

In an embodiment of the disclosure, the plurality of parameters comprises a NF-Type, a S-NSSAI of the NFC device, a NF-Instance ID of the NFC device, and a NF domain of the NFC device.

In accordance with another aspect of the disclosure, a NRF server for limiting a scope of authorization provided to a NFC device in a wireless network is provided. The NRF server includes a scope authorization controller connected to a memory and a processor. The scope authorization controller is configured to receive an NF-registration request message from a NFP device. The registration request message includes at least one of a set of the first information element indicating a single-network slice selection assistance information (S-NSSAI) of the NFC device allowed to access by the NFP device, a corresponding second information element indicating operations allowed on resources of the NFP device belonging to at least one S-NSSAI of the NFP device, and a third information element indicating the trust-level of the NFC device. Further, the scope authorization controller is configured to register a profile of the NFP device based on at least one of the first information element, the second information element and the third information element.

In accordance with another aspect of the disclosure, a NFP device for limiting a scope of authorization provided to a NFC device in a wireless network is provided. The NFP device includes a scope authorization controller connected to a memory and a processor. The scope authorization controller is configured to receive a service request message from the NFC device, where the service request message comprises an access token issued by the NRF server to allow the NFC device to access the resources of the NFP device. Further, the scope authorization controller is configured to allow to access the resources of the NFP device based on the S-NSSAI of the NFP device and the access token issued by the NRF server to allow the NFC device to access the resources of the NFP device.

In accordance with another aspect of the disclosure, a NFC device for limiting a scope of authorization in a wireless network is provided. The NFC device includes a scope authorization controller connected to a memory and a processor. The scope authorization controller is configured to send a NF discovery request to a NRF server to detect the NFP device. Further, the scope authorization controller is configured to receive a profile of the NFP device from the NRF server, where the profile of the NFP device comprises the S-NSSAIs of the NFC device supported by the NFP device. Further, the scope authorization controller is configured to send an access token request to the NRF server to access the resources of the NFP device. Further, the scope authorization controller is configured to receive an access token response including at-least one of scope of authorization, the S-NSSAIs of the NFC device, and the trust-level of the NFC device, to access the resources of the NFP device, from the NRF server.

According to an embodiment of the disclosure, it is possible to provide a method for limiting a scope of authorization to a network function (NF)-service consumer (NFC) device in a wireless network.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
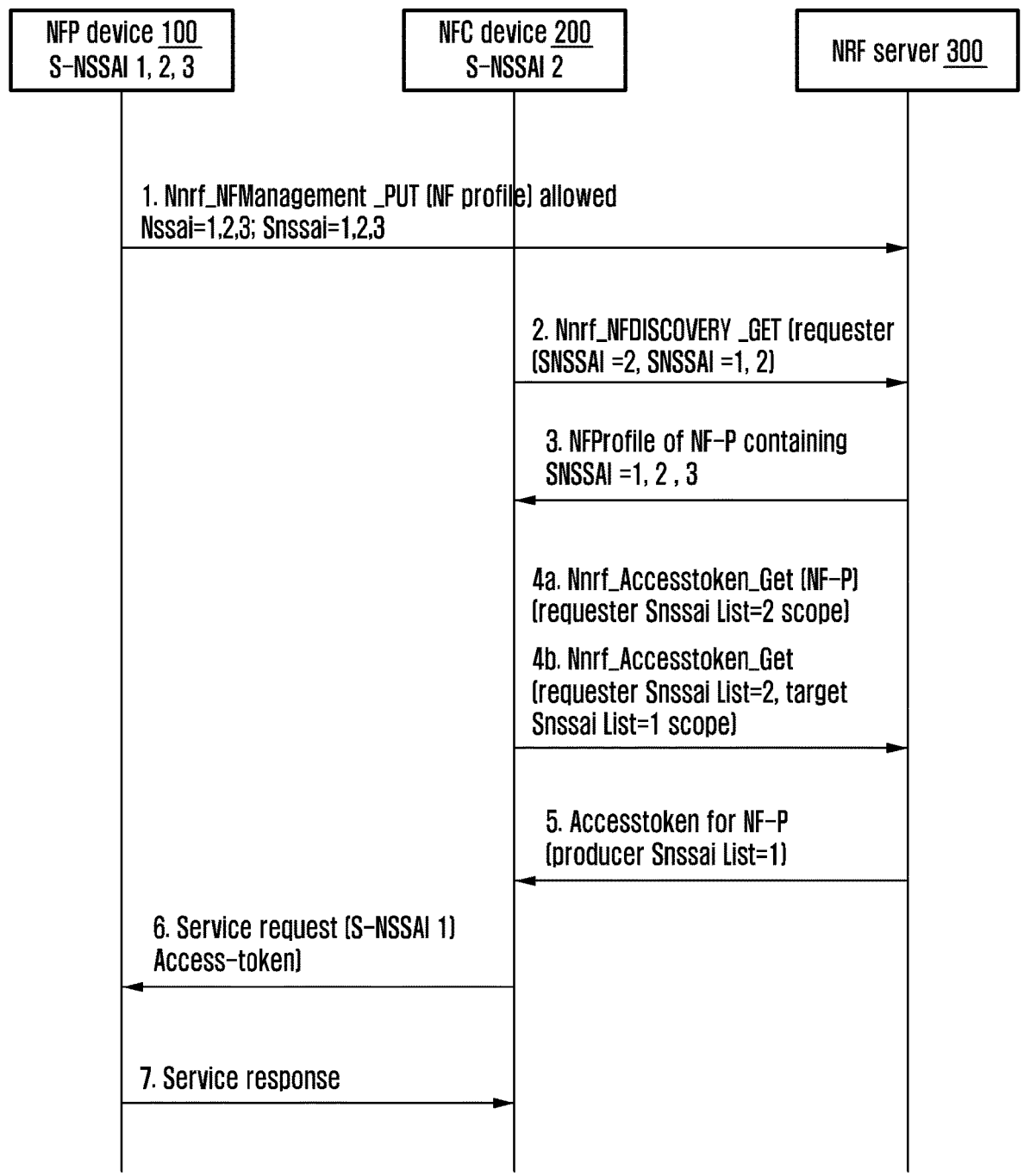
FIG. 1 illustrates a representation of a sequence of events during a typical access-token request according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As is traditional in the field, embodiments may be described and illustrated in terms of blocks which carry out a described function or functions. These blocks, which may be referred to herein as managers, units, modules, hardware components, or the like, are physically implemented by analog and/or digital circuits, such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports, such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Below abbreviations are used in this description—
UE—user equipment,
NRF—network repository function,
NF—network function,
3gpp—$3^{rd}$ generation partnership project,
NSSAI—network slice selection assistance information,
S-NSSAI—single-network slice selection assistance information,
NF-Type—type of network function (e.g., AMF, SMF, NEF),
PLMN—public land mobile network,
SNPN—standalone non-public network,
NSI—network slice instance, and
ID—identifier Below are the references—
3GPP TS 29.510-5G System, network function repository services; Stage 3,
3GPP TS 29.500-5G System, technical realization of service based architecture,
3GPP TS 33.501—security architecture and procedures for 5G System,
3GPP TS 23.501—system architecture for the 5G System (5GS), and
3GPP TS 23.502—procedures for the 5G System (5GS).

Accordingly, the embodiment herein is to provide a method for limiting a scope of authorization provided to an NFC device in a wireless network. The method includes receiving, by an NRF server, an NF-registration request message from a NFP device. The NF-registration request message includes at least one of a set of the first information element indicating a S-NSSAI of the NFC device allowed to access by the NFP device, a corresponding second information element indicating operations allowed on resources of the NFP device belonging to at least one S-NSSAI of the NFP device, and a third information element indicating a trust-level of the NFC device. Further, the method includes registering, by the NRF server, a profile of the NFP device based on at least one of the first information element, the second information element and the third information element.

Unlike methods and systems of the related art, the proposed method can be used for limiting the scope of authorization provided to the service consumer, for accessing the services provided by a service provider, in a 5G core network based on service based architecture. Further, the proposed method describes how the NF can limit the information revealed to the NF Service Consumer by use of trust-levels. Further, the proposed method describes how a NRF can include additional requester or target NF's information in the access token, so that NF Service Producer can limit the scope of access based on the information provided.

The proposed method can be used to avoid any malicious network function belonging to other slice(s), access the services from the shared network function (producer) when it is not authorized to. In the proposed method, the NF can update allowed operations per S-NSSAI in the NRF server, so that the NRF server can validate if the NF service consumer from a different slice is allowed to access the requested service in the NF Service Producer.

Referring now to the drawings and more particularly to FIGS. 2 to 8 where similar reference characters denote corresponding features consistently throughout the figures, there are shown preferred embodiments.

The terms "access token" and "authorization token" are used interchangeably throughout the document.

FIG. 1 illustrating a representation of a sequence of events during a typical access-token request according to an embodiment of the disclosure.

Referring to FIG. 1, consider methods and systems of the related art, shows an example sequence of events to highlight the problems the disclosure attempts to resolve. In this example, NF-C is a malicious network function, which, while only allowed to access services/resources/data belonging to S-NSSAI=2, attempts to access services/resources/data belonging to S-NSSAI=1. Below steps are as follows:

The NF service producer (NF-P) device (100) registers its profile in NRF server (300) using Nnrf_NFManagement service. It indicates, in its profile, that it supports S-NSSAI=1, 2, 3 and that only the NF service consumers (NF-C) device (200) belonging to S-NSSAI=1, 2, 3 are allowed to access it.

The NF service consumer (NF-C) device (200) requests the NRF server (300) to provide a list of NFs supporting S-NSSAI=1, 2 by using Nnrf_NFDiscovery service. The request may also include the requester's (NF-C's) S-NSSAI (S-NSSAI=2).

The NRF server (300) validates that the NF-C device (200) is allowed to access the NF-P device (100). Since it belongs to S-NSSAI=2, it is allowed as per the NF-Profile of the NF-P device (100) created in Step #1. It returns the NF-Profile of NF-P device (100), which also contains the information that it supports S-NSSAI=1, 2, 3.

One of the following events happens:

NF-C device (200) requests an access-token from the NRF server (300), to access the NF-P device (100), the request containing the requester's (NF-C's)S-NSSAI (S-NSSAI=2), and the scope (e.g., services it wishes to access in the NF-P).

The NF-C device (200) requests the access-token from the NRF server (300), to access NF service producers, which have nfType same as that of NF-P device (100), the request contains the requester's (NF-C's)S-NSSAI (S-NSSAI=2), S-NSSAIs it wishes should be supported by the producer NFs (e.g., S-NSSAI=1 in this example), and the scope (e.g., services it wishes to access in the NF-P).

The NRF server (300) provides access-token to access the NF-P device (100), and/or access-token to access NF service producers supporting S-NSSAI=1 (which will also include NF-P).

The NF-C device (200) issues a request to the NF-P device (100) to access services, resources or data belonging to subscribers of S-NSSAI=1, even as the NF-C device (200) itself belongs to S-NSSAI=2.

The NF-P device (100), upon finding that NF-C device (200) has a valid access-token, allows the NF-C device (200) to access the data of subscribers of S-NSSAI=1.

Following are the list of issues in above sequence of events:

In Step #3, when the NRF server (300) needs to return to the NF-C device (200), the NF-Profiles of NFs supporting S-NSSAI=1, 2, it may validate, based on the local policy, whether the NF-C device (200) is allowed to access NFs belonging to S-NSSAI=1, and thus limit the list of NF-Profiles to only those which serve S-NSSAI=2. However, the NF-Profile returned by NRF server (300) contains parameter S-Nssai is, which contains the list of S-NSSAIs supported by the target-NF (NF-P). In this case, it contains S-NSSAIs=1, 2, 3. Thus, NF-C device (200) gets to know that NF-P device (100) supports other S-NSSAIs as well and the NF-P device (100) is a shared-NF. With this information, it may try to access data of other slices in NF-P.

Thus, there is a need to limit the information NRF server (300) provides to the NF Service Consumers. In more generic terms, the NF service producer should be able to limit the amount of information it provides to the NF service consumers, based on the profile of the NF service consumers (e.g., supported S-NSSAIs, NF-Type), and/or reject the request to access information it is not supposed to access.

A similar example is in Step #6. If, let's say, the NF-C device (200) is allowed to perform read-operation on some of the resources of NF-P device (100). However, since the NF-P device (100) only knows that the NF-C device (200) is allowed to access a resource, it may not limit the amount of information it provides to the NF-C device (200). Some of the information may be sensitive (e.g., user IDs). There needs to be a way for NF Service Producers to know what the trust level of NF service consumer is, and filter the information accordingly.

In Step #5, when the NRF server (300) grants access-token to NF-C device (200), to be able to access the NF-P device (100), the access-token does not contain the S-NSSAI of requester (NF-C). Without this information, if the NF-C device (200) tries to access a service/resource/data belonging to S-NSSAI=1 in the NF-P device (100) in Step #6, even if the NF-P device (100) has local policies to prevent such access, it cannot prevent it, as it does not know the S-NSSAI of NF-C device (200). Thus, there is a need to include the S-NSSAI of requester NF in the access-token granted by the NRF server (300).

In Step #1, when the NF service producer registers/updates its profile in the NRF server (300), it contains certain parameters like allowed operationsperNfType or allowed operationsPerNfInstance, which can restrict the access to its resources based on NF-Type of NF service consumer, or based on specific NF-Instance ID of NF service consumer. However, it does not provide similar information based on requester S-NSSAI, e.g., if it wants to limit access to its resources based on S-NSSAI of the NF service consumer. It is left to local configurations in NRF server (300) to enforce such policies.

In Step #5, when the NRF server (300) grants access-token to the NF-C device (200), to be able to access the NF-P device (100), the access-token does not contain the S-NSSAIs of NF service producer (NF-P) device (100), which the requester (NF-C) is allowed to access in the NF service producer (NF-P) device (100). Without this information, when the NF-C device (200) tries to access a service/resource/data belonging to S-NSSAI=1 in NF-P in Step #6, the NF-P device (100) does not know if the NF-C device (200) is allowed to access inter-slice data, and may end up allowing the access.

Figure 2:
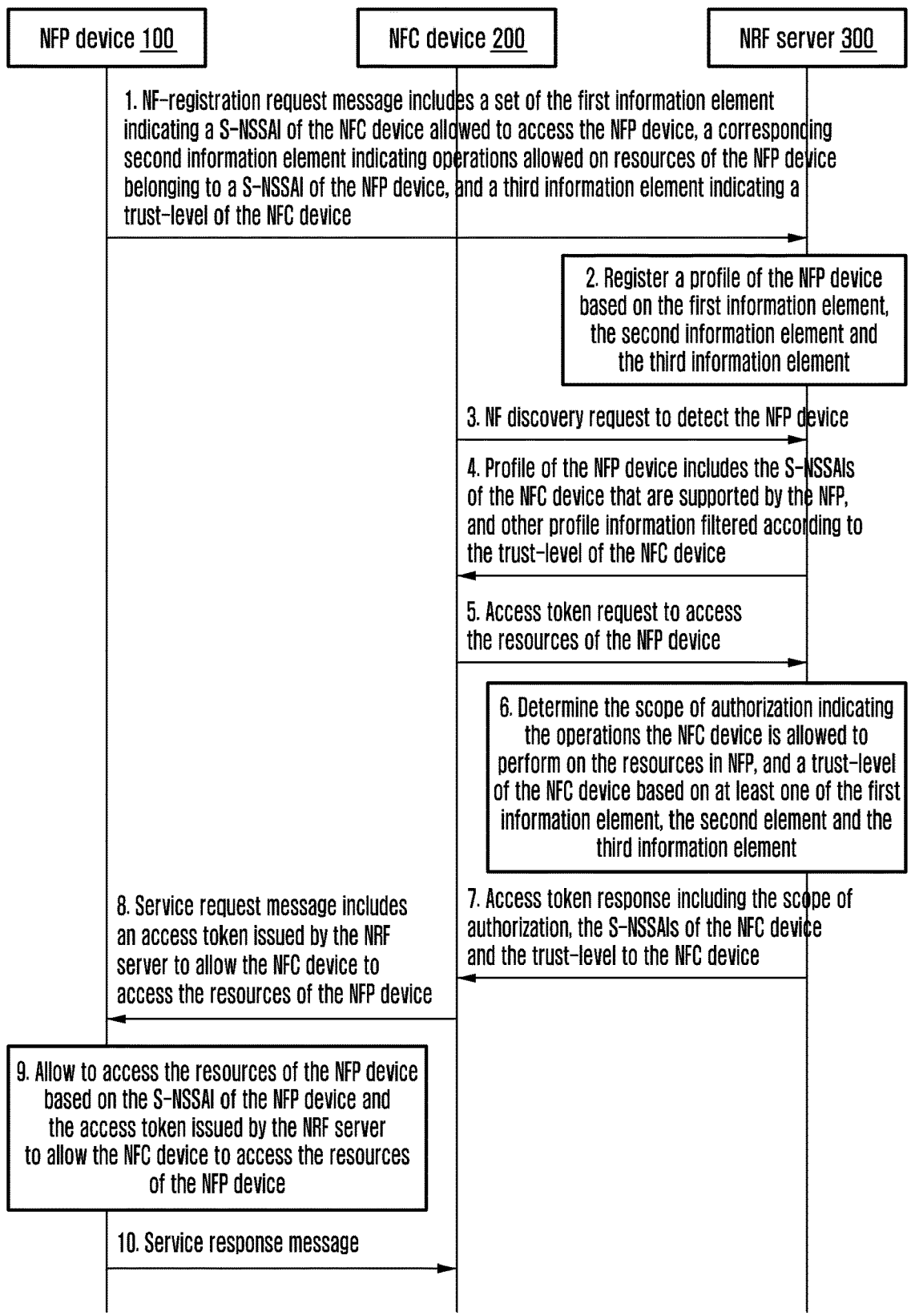
FIG. 2 is a sequence diagram chart illustrating a method for limiting a scope of authorization provided to a network function (NF)-service consumer (NFC) device in a wireless network according to an embodiment of the disclosure.

FIG. 2 is a sequence diagram chart illustrating a method for limiting a scope of authorization provided to an NFC device in a wireless network according to an embodiment of the disclosure.

Referring to FIG. 2, at step 1, the NFP device (100) sends the NF-registration request message to the NRF server (300). The NF-registration request message includes a set of a first information element indicating a S-NSSAI of the NFC device (200) allowed to access by the NFP device (100), the corresponding second information element indicating operations allowed on resources of the NFP device (100) belonging to the S-NSSAI of the NFP device (100), and/or the third information element indicating the trust-level of the NFC device (200). The NRF server (300) receives the NF-registration request message from the NFP device (100).

At step 2, the NRF server (300) registers the profile of the NFP device (100) based on the first information element, the second information element and the third information element.

At step 3, the NRF server (300) receives the NF discovery request from the NFC device (200) to detect the NFP device (100).

At step 4, based on the NF discovery request, the NRF server (300) sends the profile of the NFP device (100) to the NFC device (200). The profile of the NFP device (100) includes the S-NSSAIs of the NFC device (200) that are supported by the NFP device (100), and optionally other profile information filtered according to the trust-level of the NFC device (200).

At step 5, the NFC device (200) sends an access token request to the NRF server (300) to access the resources of the NFP device (100). The NRF server (300) receives the access token request from the NFC device (200). At step 6, based on the access token request, the NRF server (300) determines the scope of authorization indicating the operations the NFC device (200) is allowed to perform on the resources in the NFP device (100), and the trust-level of the NFC device (200) based on the first information element, the second element and the third information element. At step 7, the NRF server (300) sends the access token response including the scope of authorization, the S-NSSAIs of the NFC device (200) and/or the trust-level to the NFC device (200).

At step 8, the NFC device (200) sends the service request message including the access token issued by the NRF server (300) to allow the NFC device (200) to access the resources of the NFP device (100).

At step 9, the NFP device (100) allows to access the resources of the NFP device (100) based on the S-NSSAI of the NFP device (100) and the access token issued by the NRF server (300) to allow the NFC device (200) to access the resources of the NFP device (100).

At step 10, the NFC device (200), from the NFP device (100), receives the service response message to allow access to the operations of the NFP device (100) based on the access token issued by the NRF server (300).

In order to address problem #1 in an embodiment of the disclosure, when the NRF server (300) (and/or an NF playing the role of OAuth 2.0 Authorization Server) issues access-token containing accesstokenclaims to the NF service consumer (so that NF service consumer can access specific services, resources and/or operations offered by an NF service producer), it includes an additional information-element in the access-token, identifying the "trust-level" of the NF service consumer. The trust-level could be, for example, "Restricted", "Full Access," or the like. Based on such trust-level, the NF service producer can limit the amount of information it provides to the NF service consumer, when it accesses its services/resources/data. Such parameter (trust-level) could be provided at NF level or NF-service level.

In an embodiment of the disclosure, all the NF service producers locally categorize their data according to trust-level, so that they can filter the information provided to NF service consumer, when the NF service consumer wishes to access their services/resources/data.

In an embodiment of the disclosure, when the NF (e.g., NF service producer) registers or updates its profile in the NRF server (300), it includes a new information element, which indicates the trust-level it allows to its NF Service Consumers, based on their NF-Type, S-NSSAI, NF-Instance ID, NF Domain and/or other such NF Identity. The NRF server (300) can use this information while granting access token to the NF service consumer, who wishes to access services offered by the NF service producer.

In another embodiment of the disclosure, the "trust level" could be list of set of services based on per S-NSSAIs granularity.

In an embodiment of the disclosure, the OAM configures in the NRF server (300), the trust-level that the NRF server (300) should provide in access-token, depending on, e.g., the NF-Types, S-NSSAIs, NF-Instance IDs, NF Domains and/or other such NF identities of NF service producer and NF service consumer.

In an embodiment of the disclosure, the NF service producers can filter the information they provide to NF service consumers based on NF-Type, S-NSSAI, NF-Instance ID, NF Domain and/or other such NF identity of the NF service consumers.

In an embodiment of the disclosure, the NRF server (300) should have the ability to restrict the NF discovery i.e., should restrict the NF producer to be discovered unless the NF consumer is allowed to, based on certain limitation. The NRF server (300) authorizes the Nnrf_NFDiscovery request. Based on the NF profile of the expected NF service and the type of the NF service consumer, the NRF server (300) determines whether the NF service consumer is allowed to discover the expected NF service instance(s). The requester-snssais IE should contain the list of S-NSSAI of the requester NF (NF consumer). The NRF server (300) uses this to return only those NF profiles of NF service Instances allowing to be discovered from the slice(s) identified by this IE, according to the "allowedNssais" list in the NF profile and NF service" as specified in TS 29.510, clause 6.2.3.2.3.1.

In order to address problem #2, in an embodiment of the disclosure, when the NRF server (300) (and/or an NF playing the role of OAuth 2.0 authorization server) issues access-token containing accesstokenclaims to an NF service consumer (so that NF service consumer can access specific services, resources and/or operations offered by an NF service producer), it includes an additional information-element in the access-token, identifying the S-NSSAI of requester NF (NF service consumer). When the NF service consumer presents this access-token to NF service producer, the NF service producer may use this information to limit the level of access it provides to the NF service consumer, especially if it wishes to access data belonging to another slice.

In order to address problem #3, in an embodiment of the disclosure, when the NF (e.g., NF service producer) registers or updates its profile in the NRF server (300), it includes a new information element, e.g., allowedOperationsPerSnssai, which specifies allowed operations on its resources, for NFs belonging to the given S-NSSAI. The information could be encoded, e.g., as a map data-structure, where the key of the map is the S-NSSAI, and the value is an array of scopes. The attribute can then be used by the NRF server (300) to determine whether a given resource/operation-level scope can be granted to the NF service consumer that requested an Oauth2 access token with a specific scope.

In order to address problem #4, in an embodiment of the disclosure, when the NRF server (300) (and/or an NF playing the role of OAuth 2.0 authorization server) issues access-token containing AccessTokenClaims to the NF service consumer (so that NF service consumer can access specific services, resources and/or operations offered by an NF service producer), it includes an additional information-element in the access-token (or enhances an existing information-element), identifying the S-NSSAIs it is allowed to access in the target-NF (NF service producer). For example, in a shared NF serving multiple S-NSSAIs, access-token issued by the NRF server (300) can indicate which part of data in the NF service producer can be accessed by the NF Service Consumer.

An example implementation of this solution will be to update the description of information element "producerSnssaiList" in 3GPP TS 29.510, Table 6.3.5.2.4, indicating that "when included, this IE indicates the S-NSSAIs NF-producer is expected to support and NF-Consumer is allowed to access". In alternate implementations, this could be intimated via a new Information Element.

In an embodiment of the disclosure, the scope of the access token is mapped to per allowed S-NSSAIs based granularity. The NF consumer is only allowed to access the services from NF service producer as per the mapping.

Figure 3:
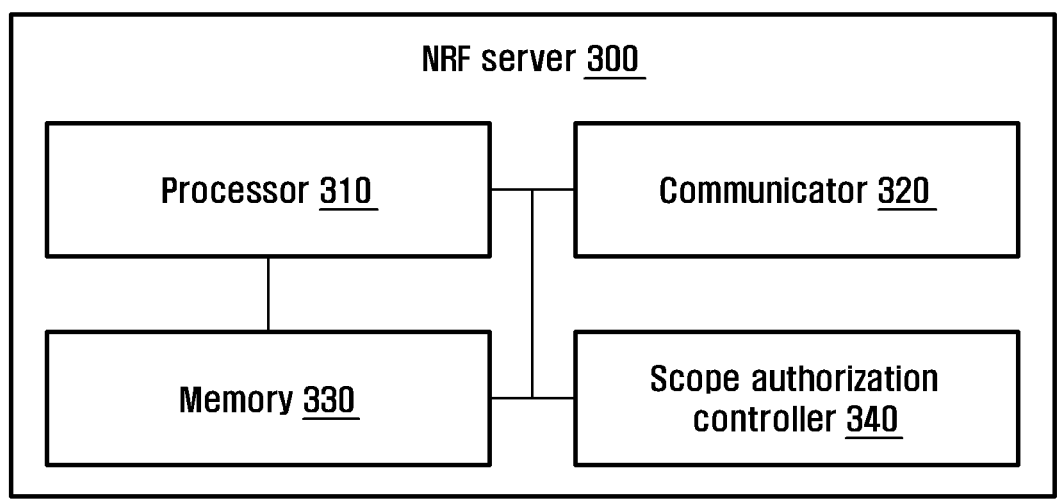
FIG. 3 illustrates various hardware components of a network repository function (NRF) server according to an embodiment of the disclosure.

FIG. 3 illustrates various hardware components of an NRF server according to an embodiment of the disclosure.

Referring to FIG. 3, an NRF server (300) includes a processor (310), a communicator (320), a memory (330), and a scope authorization controller (340). The processor (310) is coupled with the communicator (320), the memory (330), and the scope authorization controller (340).

The scope authorization controller (340) is configured to receive the NF-registration request message from the NFP device (100). The registration request message includes the set of the first information element indicating the S-NSSAI of the NFC device (200) allowed to access by the NFP device (100), the corresponding second information element indicating operations allowed on resources of the NFP device (100) belonging to the S-NSSAI of the NFP device (100), and the third information element indicating the trust-level of the NFC device (200). Based on the first information element, the second information element and the third information element, the scope authorization controller (340) is configured to register a profile of the NFP device (100).

Further, the scope authorization controller (340) is configured to receive the NF discovery request from the NFC device (200) to detect the NFP device (100). Further, the scope authorization controller (340) is configured to send the profile of the NFP device (100) to the NFC device (200). The profile of the NFP device (100) includes the S-NSSAIs of the NFC device (200) that are supported by the NFP device (100), and other profile information filtered according to the trust-level of the NFC device (200).

Further, the scope authorization controller (340) is configured to receive the access token request from the NFC device (200) to access the resources of the NFP device (100). Further, the scope authorization controller (340) is configured to determine the scope of authorization indicating the operations the NFC device (200) is allowed to perform on the resources in the NFP device (100), and the trust-level of the NFC device (200) based on the first information element, the second element and the third information element. Based on the access token request, the scope authorization controller (340) is configured to send the access token response including the scope of authorization, the S-NSSAIs of the NFC device (200) and the trust-level to the NFC device (200). The trust-level indicates the partial access to the resources of the NFP device (100) by the NFC device (200) or the full access to the resources of the NFP device (100) by the NFC device (200).

The scope authorization controller (340) is physically implemented by analog and/or digital circuits, such as logic gates, integrated circuits, microprocessors, microcontrollers, memory circuits, passive electronic components, active electronic components, optical components, hardwired circuits and the like, and may optionally be driven by firmware.

Further, the processor (310) is configured to execute instructions stored in the memory (330) and to perform various processes. The communicator (320) is configured for communicating internally between internal hardware components and with external devices via one or more networks. The memory (330) also stores instructions to be executed by the processor (310). The memory (330) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (330) may, in some examples, be considered a non-transitory storage medium. The term "non-transitory" may indicate that the storage medium is not embodied in a carrier wave or a propagated signal. However, the term "non-transitory" should not be interpreted that the memory (330) is non-movable. In certain examples, a non-transitory storage medium may store data that can, over time, change (e.g., in a random access memory (RAM) or cache).

Although the FIG. 3 shows various hardware components of the NRF server (300) but it is to be understood that other embodiments are not limited thereon. In an embodiment of the disclosure, the NRF server (300) may include less or more number of components. Further, the labels or names of the components are used only for illustrative purpose and does not limit the scope of the disclosure. One or more components can be combined together to perform same or substantially similar function in the NRF server (300).

Figure 4:
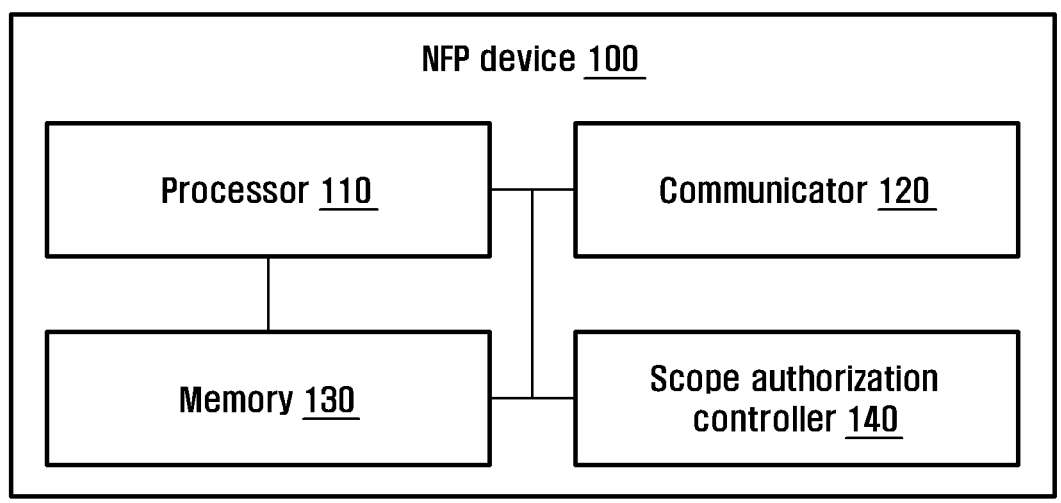
FIG. 4 illustrates various hardware components of a NF-service producer (NFP) device according to an embodiment of the disclosure.

FIG. 4 illustrates various hardware components of an NFP device according to an embodiment of the disclosure.

Referring to FIG. 4, the NFP device (100) includes a processor (110), a communicator (120), a memory (130), and a scope authorization controller (140). The processor (110) is coupled with the communicator (120), the memory (130), and the scope authorization controller (140).

The scope authorization controller (140) is configured to receive the service request message from the NFC device (200). The service request message includes the access token issued by the NRF server (300) to allow the NFC device (200) to access the resources of the NFP device (100). The access token includes scope of authorization, the S-NSSAIs of the NFC device (200) and the trust-level of the NFC device (200). Based on the S-NSSAI of the NFP device (100) and the access token issued by the NRF server (300) to allow the NFC device (200) to access the resources of the NFP device (100), the scope authorization controller (140) is configured to allow for accessing the resources of the NFP device (100). Further, the scope authorization controller (140) is configured to filter the information provided to the NFC device (200) according to the trust-level received in the access-token.

The scope authorization controller (140) is physically implemented by analog and/or digital circuits, such as logic gates, integrated circuits, microprocessors, microcontrollers, memory circuits, passive electronic components, active electronic components, optical components, hardwired circuits and the like, and may optionally be driven by firmware.

Further, the processor (110) is configured to execute instructions stored in the memory (130) and to perform various processes. The communicator (120) is configured for communicating internally between internal hardware components and with external devices via one or more networks. The memory (130) also stores instructions to be executed by the processor (110). The memory (130) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (130) may, in some examples, be considered a non-transitory storage medium. The term "non-transitory" may indicate that the storage medium is not embodied in a carrier wave or a propagated signal. However, the term "non-transitory" should not be interpreted that the memory (130) is non-movable. In certain examples, a non-transitory storage medium may store data that can, over time, change (e.g., in a random access memory (RAM) or cache).

Although the FIG. 4 shows various hardware components of the NFP device (100) but it is to be understood that other embodiments are not limited thereon. In an embodiment of the disclosure, the NFP device (100) may include less or more number of components. Further, the labels or names of the components are used only for illustrative purpose and does not limit the scope of the disclosure. One or more components can be combined together to perform same or substantially similar function in the NFP device (100).

Figure 5:
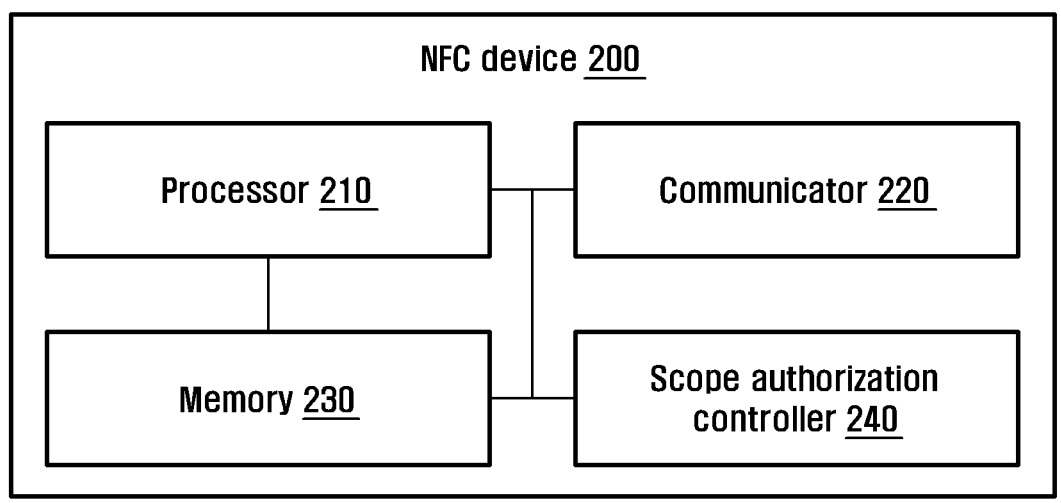
FIG. 5 illustrates various hardware components of an NFC device according to an embodiment of the disclosure.

FIG. 5 illustrates various hardware components of an NFC device according to an embodiment of the disclosure.

Referring to FIG. 5, the NFC device (200) includes a processor (210), a communicator (220), a memory (230), and a scope authorization controller (240). The processor (210) is coupled with the communicator (220), the memory (230), and the scope authorization controller (240).

The scope authorization controller (240) is configured to send the NF discovery request to the NRF server (300) to detect the NFP device (100) and receive the profile of the NFP device (100) from the NRF server (300). The profile of the NFP device (100) includes the S-NSSAIs of the NFC device (200) supported by the NFP device (100). Further, the scope authorization controller (240) is configured to send the access token request to the NRF server (300) to access the resources of the NFP device (100). Based on the access token request, the scope authorization controller (240) is configured to receive the access token response including the scope of authorization, the S-NSSAIs of the NFC device (200), and the trust-level of the NFC device (200), to access the resources of the NFP device (100), from the NRF server (300).

Further, the scope authorization controller (240) is configured to send the service request message to the NFP device (100). The service request message includes the access token containing the scope of authorization, the S-NSSAIs of the NFC device (200), and the trust-level of the NFC device (200), issued by the NRF server (300), to allow the NFC device (200) to access the operations of the NFP device (100). Upon the service request message, the scope authorization controller (240) is configured to receive the service response message to allow access to the operations of the NFP device (100) based on the access token issued by the NRF server (300).

Further, the trust-level for the NFC device (200) is determined by the NRF server (300) based on a local configuration. The trust-level for the NFC device (200) is registered in the NRF server (300) by the NFP device (100) as part of NF-registration based on a plurality of parameters associated with the NFC device (200). The plurality of parameters includes a NF-Type, a S-NSSAI of the NFC device (200), a NF-Instance ID of the NFC device (200), and a NF domain of the NFC device (200).

The scope authorization controller (240) is physically implemented by analog and/or digital circuits, such as logic gates, integrated circuits, microprocessors, microcontrollers, memory circuits, passive electronic components, active electronic components, optical components, hardwired circuits and the like, and may optionally be driven by firmware.

Further, the processor (210) is configured to execute instructions stored in the memory (230) and to perform various processes. The communicator (220) is configured for communicating internally between internal hardware components and with external devices via one or more networks. The memory (230) also stores instructions to be executed by the processor (210). The memory (230) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (230) may, in some examples, be considered a non-transitory storage medium. The term "non-transitory" may indicate that the storage medium is not embodied in a carrier wave or a propagated signal. However, the term "non-transitory" should not be interpreted that the memory (230) is non-movable. In certain examples, a non-transitory storage medium may store data that can, over time, change (e.g., in a random access memory (RAM) or cache).

Although the FIG. 5 shows various hardware components of the NFC device (200) but it is to be understood that other embodiments are not limited thereon. In an embodiment of the disclosure, the NFC device (200) may include less or more number of components. Further, the labels or names of the components are used only for illustrative purpose and does not limit the scope of the disclosure. One or more components can be combined together to perform same or substantially similar function in the NFC device (200).

Figure 6:
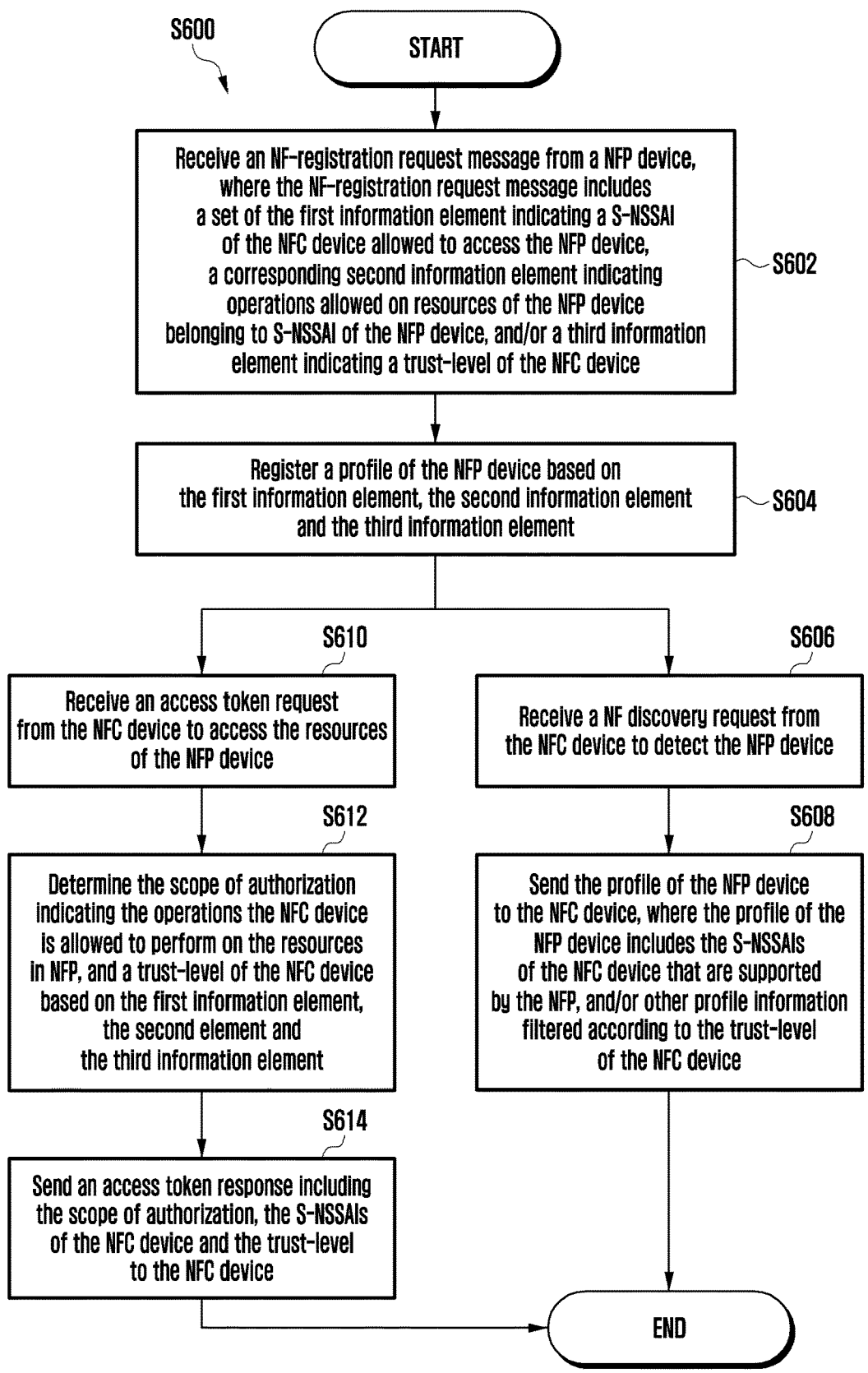
FIG. 6 is a flowchart illustrating a method, implemented by an NRF server, for limiting a scope of authorization provided to an NFC device in a wireless network, according to an embodiment of the disclosure.

FIG. 6 is a flowchart illustrating a method, implemented by an NRF server for limiting a scope of authorization provided to an NFC device in a wireless network, according to an embodiment of the disclosure.

Referring to FIG. 6, the operations S600-S614 may be performed by the scope authorization controller (340).

At operation S602, the method includes receiving the NF-registration request message from the NFP device (100). The NF-registration request message includes the set of the first information element indicating the S-NSSAI of the NFC device (200) allowed to access by the NFP device (100), the corresponding second information element indicating operations allowed on resources of the NFP device (100) belonging to the S-NSSAI of the NFP device (100), and a third information element indicating the trust-level of the NFC device (200).

At operation S604, the method includes registering the profile of the NFP device (100) based on the first information element, the second information element and the third information element.

At operation S606, the method includes receiving the NF discovery request from the NFC device (200) to detect the NFP device (100).

At operation S608, the method includes sending the profile of the NFP device (100) to the NFC device (200). The profile of the NFP device (100) includes the S-NSSAIs of the NFC device (200) that are supported by the NFP device (100) and other profile information filtered according to the trust-level of the NFC device (200).

At operation S610, the method includes receiving the access token request from the NFC device (200) to access the resources of the NFP device (100).

At operation S612, the method includes determining the scope of authorization indicating the operations the NFC device (200) is allowed to perform on the resources in the NFP device (100) and the trust-level of the NFC device (200) based on the first information element, the second element and the third information element.

At operation S614, the method includes sending the access token response including the scope of authorization, the S-NSSAIs of the NFC device (200) and the trust-level to the NFC device (200).

Figure 7:
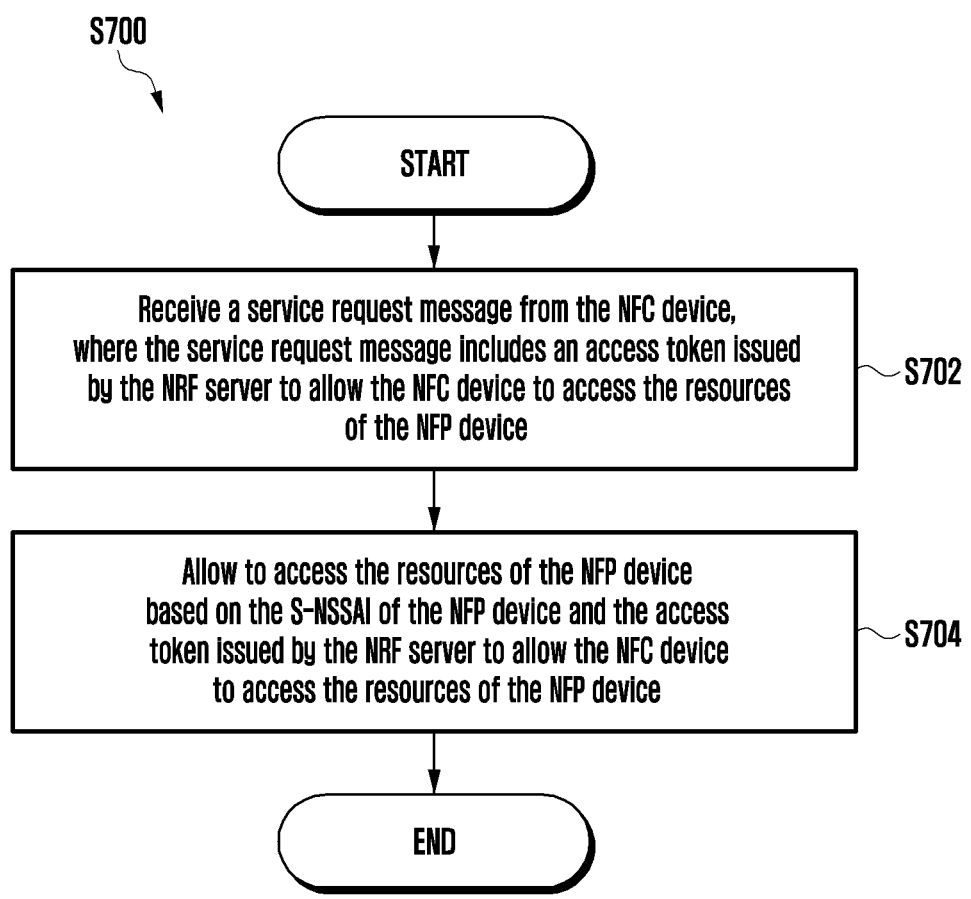
FIG. 7 is a flowchart illustrating a method, implemented by an NFP device, for limiting a scope of authorization provided to an NFC device in a wireless network, according to an embodiment of the disclosure.

FIG. 7 is a flowchart illustrating a method, implemented by an NFP device for limiting a scope of authorization provided to an NFC device in a wireless network, according to an embodiment of the disclosure.

Referring to FIG. 7, the operations S700 to S704 may be performed by the scope authorization controller (140).

At operation S702, the method includes receiving the service request message from the NFC device (200). The service request message includes the access token issued by the NRF server (300) to allow the NFC device (200) to access the resources of the NFP device (100).

At operation S704, the method includes allowing for accessing the resources of the NFP device (100) based on the S-NSSAI of the NFP device (100) and the access token issued by the NRF server (300) to allow the NFC device (200) to access the resources of the NFP device (100).

Figure 8:
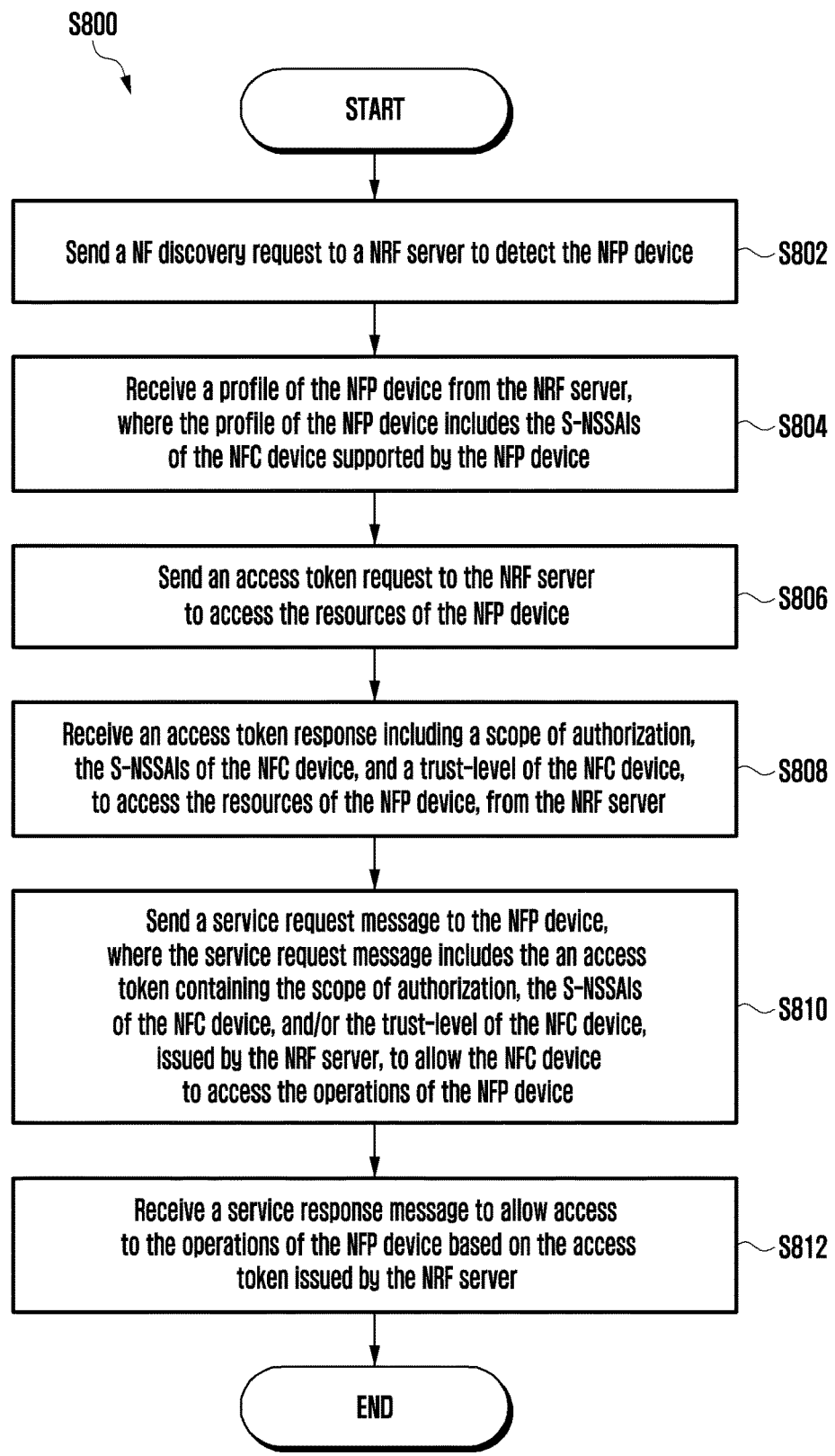
FIG. 8 is a flowchart illustrating a method, implemented by an NFC device, for limiting the scope of authorization provided to an NFC device in a wireless network, according to an embodiment of the disclosure.

FIG. 8 is a flowchart illustrating a method, implemented by an NFC device, for limiting the scope of authorization in a wireless network, according to an embodiment of the disclosure. Referring to FIG. 8, the operations S800-S812 may be performed by the scope authorization controller (240).

At operation S802, the method includes sending the NF discovery request to the NRF server (300) to detect the NFP device (100).

At operation S804, the method includes receiving the profile of the NFP device (100) from the NRF server (300). The profile of the NFP device (100) includes the S-NSSAIs of the NFC device (200) supported by the NFP device (100).

At operation S806, the method includes sending the access token request to the NRF server (300) to access the resources of the NFP device (100).

At operation S808, the method includes receiving the access token response including the scope of authorization, the S-NSSAIs of the NFC device (200), and the trust-level of the NFC device (200), to access the resources of the NFP device (100), from the NRF server (300).

At operation S810, the method includes sending the service request message to the NFP device (100). The service request message includes an access token containing the scope of authorization, the S-NSSAIs of the NFC device (200), and the trust-level of the NFC device (200), issued by the NRF server (300), to allow the NFC device (200) to access the operations of the NFP device (100).

At operation S812, the method includes receiving the service response message to allow access to the operations of the NFP device (100) based on the access token issued by the NRF server (300).

The various actions, acts, blocks, steps, or the like, in the flow charts operations S600-S800 may be performed in the order presented, in a different order or simultaneously. Further, in an embodiment of the disclosure, some of the actions, acts, blocks, steps, or the like, may be omitted, added, modified, skipped, or the like, without departing from the scope of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a network repository function (NRF) server for limiting a scope of authorization provided to a network function (NF)-service consumer (NFC) device in a wireless network, the method comprising:
   receiving, by the NRF server, an NF-registration request message from a NF-service producer (NFP) device,
   wherein the NF-registration request message comprises:
      a first information element indicating a single-network slice selection assistance information (S-NSSAI) of the NFC device allowed to access by the NFP device,
      a corresponding second information element indicating operations allowed on resources of the NFP device belonging to at least one S-NSSAI of the NFP device, and
      a third information element indicating a trust-level of the NFC device, the trust-level relating to an access rule specifying a scope of access allowed for the NFC device, wherein the trust-level is used for limiting an amount of information provided to the NFC device; and
   registering a profile of the NFP device based on at least one of the first information element, the second information element, or the third information element.

2. The method of claim 1, further comprising:
   receiving a NF discovery request from the NFC device to detect the NFP device; and
   transmitting the profile of the NFP device to the NFC device,
   wherein the profile of the NFP device comprises at-least one of the S-NSSAIs of the NFC device that are supported by the NFP device, and other profile information filtered according to the trust-level of the NFC device.

3. The method of claim 1, further comprising:
   receiving an access token request from the NFC device to access the resources of the NFP device;
   determining at least one of the scope of authorization indicating the operations the NFC device is allowed to perform on the resources in the NFP device, and the trust-level of the NFC device based on at least one of the first information element, the second information element, or the third information element; and
transmitting an access token response including at least one of the scope of authorization, the S-NSSAIs of the NFC device, or the trust-level to the NFC device.

4. The method of claim 3, wherein the trust-level indicates a partial access to the resources of the NFP device by the NFC device or a full access to the resources of the NFP device by the NFC device.

5. A method performed by a network function producer (NFP) device for limiting a scope of authorization provided to a NF service consumer (NFC) device in a wireless network, the method comprising:
transmitting, to a network repository function (NRF) server, an NF-registration request message comprising a first information element indicating a single-network slice selection assistance information (S-NSSAI) of the NFC device allowed to access by the NFP device, a corresponding second information element indicating operations allowed on resources of the NFP device belonging to at least one S-NSSAI of the NFP device, and a third information element indicating a trust-level of the NFC device, the trust-level relating to an access rule specifying a scope of access allowed for the NFC device, wherein the trust-level is used for limiting an amount of information provided to the NFC device;
receiving a service request message from the NFC device, wherein the service request message comprises an access token issued by the NRF server to allow the NFC device to access resources of the NFP device; and
allowing to access the resources of the NFP device based on the S-NSSAI of the NFP device and the access token issued by the NRF server to allow the NFC device to access the resources of the NFP device.

6. The method of claim 5, wherein the access token comprises at least one of scope of authorization, the S-NSSAIs of the NFC device, or a trust-level of the NFC device.

7. The method of claim 5, wherein the NFP device filters information is provided to the NFC device according to a trust-level received in the access token.

8. A method performed by a network function-service consumer (NFC) device for limiting a scope of authorization provided to the NFC device in a wireless network, the method comprising:
transmitting a NF discovery request, by the NFC device, to a network repository function (NRF) server to detect a network function producer (NFP) device;
receiving a profile of the NFP device from the NRF server, wherein the profile of the NFP device comprises single-network slice selection assistance information (S-NSSAIs) of the NFC device supported by the NFP device;
transmitting an access token request, by the NFC device, to the NRF server to access resources of the NFP device; and
receiving, from the NRF server, an access token response including a scope of authorization, the S-NSSAIs of the NFC device, and a trust-level of the NFC device, to access the resources of the NFP device, the trust-level relating to an access rule specifying a scope of access allowed for the NFC device, wherein the trust-level is used for limiting an amount of information provided to the NFC device.

9. The method of claim 8, further comprising:
transmitting a service request message to the NFP device, wherein the service request message comprises an access token containing at least one of scope of authorization, the S-NSSAIs of the NFC device, or the trust-level of the NFC device, issued by the NRF server, to allow the NFC device to access operations of the NFP device; and
receiving a service response message to allow access to the operations of the NFP device based on the access token issued by the NRF server.

10. The method of claim 8, wherein the trust-level for the NFC device is determined by the NRF server based on local configuration.

11. The method of claim 8, wherein the trust-level for the NFC device is registered in the NRF server by the NFP device as part of NF-registration based on a plurality of parameters associated with the NFC.

12. The method of claim 11, wherein the plurality of parameters comprises:
a NF-Type;
a S-NSSAI of the NFC device;
a NF-Instance identification (ID) of the NFC device; and
a NF domain of the NFC device.

13. A network repository function (NRF) server for limiting a scope of authorization provided to a network function (NF)-service consumer device in a wireless network, wherein the NRF server comprising:
memory;
at least one processor; and
a scope authorization controller, connected to the memory and the processor, configured to:
receive an NF-registration request message from NF-service producer (NFP) device, wherein the registration request message comprises a first information element indicating a single-network slice selection assistance information (S-NSSAI) of the NFC device allowed to access by the NFP device, a corresponding second information element indicating operations allowed on resources of the NFP device belonging to at least one S-NSSAI of the NFP device, and a third information element indicating a trust-level of the NFC device, the trust-level relating to an access rule specifying a scope of access allowed for the NFC device, wherein the trust-level is used for limiting an amount of information provided to the NFC device, and
register a profile of the NFP device based on at least one of the first information element, the second information element, or the third information element.

14. A network function (NF)-service producer (NFP) device for limiting a scope of authorization provided to a NF-service consumer (NFC) device in a wireless network, the NFP device comprising:
memory;
at least one processor; and
a scope authorization controller, connected to the memory and the processor, configured to:
transmit, to a network repository function (NRF) server, an NF-registration request message comprising a first information element indicating a single-network slice selection assistance information (S-NSSAI) of the NFC device allowed to access by the NFP device, a corresponding second information element indicating operations allowed on resources of the NFP device belonging to at least one S-NSSAI of the NFP device, and a third information element indicating a trust-level of the NFC device, the trust-level relating to an access rule specifying a scope of access allowed for the NFC device, wherein the trust-level is used for limiting an amount of information provided to the NFC device;

receive a service request message from the NFC device, wherein the service request message comprises an access token issued by the NRF server to allow the NFC device to access resources of the NFP device, and allow to access the resources of the NFP device based on the S-NSSAI of the NFP device and the access token issued by the NRF server to allow the NFC device to access the resources of the NFP device.

15. A network function (NF)-service consumer (NFC) device for limiting a scope of authorization in a wireless network, the NFC device comprising:

memory;

at least one processor; and a scope authorization controller, connected to the memory and the processor, configured to:

transmit a NF discovery request to a network repository function (NRF) server to detect a network function (NF)-service producer (NFP) device, receive a profile of the NFP device from the NRF server, wherein the profile of the NFP device comprises single-network slice selection assistance information (S-NSSAIs) of the NFC device supported by the NFP device, transmit an access token request to the NRF server to access resources of the NFP device, and receive, from the NRF server, an access token response including a scope of authorization, the S-NSSAIs of the NFC device, and a trust-level of the NFC device, to access the resources of the NFP device, the trust-level relating to an access rule specifying a scope of access allowed for the NFC device, wherein the trust-level is used for limiting an amount of information provided to the NFC device.

* * * * *